United States Patent

Mandeville

[11] Patent Number: 5,983,838
[45] Date of Patent: *Nov. 16, 1999

[54] BIRD PREDATION DETERRENT SHIELD FOR A CAT

[76] Inventor: Susan B. Mandeville, 743 Crest La., Springfield, Oreg. 97477

[*] Notice: This patent is subject to a terminal disclaimer.

[21] Appl. No.: 09/063,975

[22] Filed: Apr. 21, 1998

Related U.S. Application Data

[63] Continuation of application No. 08/812,575, Mar. 7, 1997, Pat. No. 5,755,186.

[51] Int. Cl.$^6$ ..................................................... A01K 29/00
[52] U.S. Cl. ............................................................. 119/853
[58] Field of Search .................................... 119/815, 816, 119/850, 853, 855, 858

[56] References Cited

U.S. PATENT DOCUMENTS 3,176,657  4/1965  Callaway ................................. 119/850
5,474,033  12/1995  Mitchell, Jr. ............................ 119/858

Primary Examiner—Robert P. Swiatek
Assistant Examiner—Elizabeth Shaw
Attorney, Agent, or Firm—David S. Alavi

[57] ABSTRACT

A bird predation deterrent shield is described herein comprising a sheet of flexible material suspended from the anterior neck region of a cat, at least as wide at its bottom as the shoulders of the cat, and sufficiently long to reach the level of the carpal regions of the cat when the cat is standing on all four limbs. Bird predation deterrent methods are disclosed herein comprising placing such a bird predation deterrent shield on a cat whenever the cat is outdoors. Use of a shield according to the present invention has been shown to drastically reduce the number of birds killed by a cat when worn by the cat while outdoors.

11 Claims, 3 Drawing Sheets

BIRD PREDATION DETERRENT SHIELD FOR A CAT

RELATED APPLICATIONS

This application is a continuation prior-filed, nonprovisional application Ser. No. 08/812,575, filed Mar. 7, 1997, said application being incorporated by reference as if fully set forth herein U.S. Pat. No. 5,755,186.

FIELD OF THE INVENTION

The field of the present invention relates to animal husbandry. In particular, a shield for a cat is described herein for deterring bird predation.

BACKGROUND

The problem of domestic cats killing wild birds is enormous. It is estimated that 4.4 million songbirds are killed by domestic cats each day in the United States alone. That statistic, coupled with the continual destruction of wildlife habitat which further depletes bird populations, shows a great need for means for preserving the wild bird population. This problem is documented in the following references: Richard Stallcup, "Cats: A Heavy Toll on Songbirds. A Reversible Catastrophe," Point Reyes Bird Observatory Observer 91 8 (1991); P. B. Churcher and J. H. Lawton, "Predation by domestic cats in an English village", J. Zoology 211 439 (1987).

Presently the only method for completely preventing a domestic cat from killing birds has been to keep the cat indoors. This is a solution that a majority of cat owners do not find agreeable, therefore few of them keep their cats indoors. The attitudes of pet owners are as hard to overcome as a cat's natural hunting instincts.

Another less than satisfactory method for preventing bird predation by a cat has been to put a bell on the cat's collar. The sound of the bell is thought to warn birds of an approaching cat and give them time to escape. In actuality "belling the cat" does not work well if at all, since many new birds may come into an area that are unaware of the meaning of the bell and often the cat learns to stalk in a way which keeps the bell silent. Nor has it ever been clearly established that birds specifically associate the sound of the bell with a cat.

Another method that has been used to try to prevent bird predation by a cat is fencing the cat away from areas frequented by birds, such as near a bird feeder. Bird feeders are meant to attract birds and naturally cats are attracted to areas where birds often are. Due to the cat's prowess in leaping and climbing, fencing cats away from the feeder is often quite ineffectual. Often people face the choice of either having a cat or feeding the birds. However feeding birds and not owning a cat is not a solution, since a bird feeder will attract other neighborhood cats as well. Even when fencing around the bird feeder is effective, some birds are likely to stray out of the fenced bird feeder enclosure and into the close range of a cat. Then too, many people consider a fenced bird feeder unattractive and difficult to access, and will therefore not use this method for preventing cat predation of birds.

Placement of the bird feeders in a location impeding cats from getting close to the feeding birds has also been tried. One such location for the bird feeder might be high off the ground, but this does not prevent ground feeding birds from gathering to eat spilled seed and thus landing within the range of a waiting cat. An adjunct to high placement of the bird feeder might be locating it away from bushes or other objects that a cat could use to hide behind. This may reduce the bird killing somewhat, but cannot be considered an effective preventive measure.

One partial solution to the problem of cats killing so many birds would be a reduction of the number of cats. It is estimated that there are 60 million cats in the United States. Humane Societies and animal shelters are barely able to keep up with the numbers of unwanted cats (and dogs). Tragically many of the public are reluctant to neuter their pets and by not doing so drain public resources required to deal with the resultant pet over-population problem. The over-population of cats contributes to the large numbers of birds killed by cats.

A long standing need therefore exists to provide a solution to the problem of bird predation by domestic cats which would be acceptable to and widely implemented by cat owners.

SUMMARY

Certain aspects of the present invention may overcome aforementioned drawbacks of the previous art and advance the state-of-the-art of bird predation deterrent methods and apparatus for cats, and in addition may meet one or more of the following objects:

To provide methods and apparatus for deterring bird predation by a cat;

To provide methods and apparatus for deterring bird predation by a cat which are willingly used and/or implemented by domestic cat owners;

To provide methods and apparatus for deterring bird predation by a cat while allowing the cat free access to the outdoors;

To provide methods and apparatus for deterring bird predation by a cat which does not interfere with other activities of the cat;

To provide methods and apparatus for deterring bird predation by a cat which is comfortable for the cat;

To provide methods and apparatus for deterring bird predation by a cat which may be readily used and/or implemented by persons having no animal husbandry skills;

To provide methods and apparatus for deterring bird predation by a cat having economies of parts, manufacture, and/or implementation; and To provide methods and apparatus for deterring bird predation by a cat which are environmentally safe.

One or more of these objects may be achieved according to the present invention by: a bird predation deterrent shield for a cat, comprising a sheet of flexible material suspended from the anterior neck region of the cat, at least as wide at its bottom as the shoulders of the cat, and sufficiently long to reach the level of the carpal regions of the cat when the cat is standing on all four limbs; and placing such a bird predation deterrent shield on a cat whenever the cat is outdoors. A shield according to the present invention has been shown to drastically reduce the number of birds killed by a cat when worn by the cat while outdoors. The shield and its use may be readily and willingly used and/or implemented by cat owners of any degree of animal husbandry skills, and furthermore may be comfortable for the cat and may not interfere with other activities of the cat. The shield and its use may be quite economical to manufacture and/or implement, and carry no risk of harm to the environment.

Additional objects and advantages of the present invention may become apparent upon referring to the preferred and alternative embodiments of the present invention as illustrated in the drawings and/or described in the following written description and/or claims.

DETAILED DESCRIPTION OF PREFERRED AND ALTERNATIVE EMBODIMENTS

Figure 1:
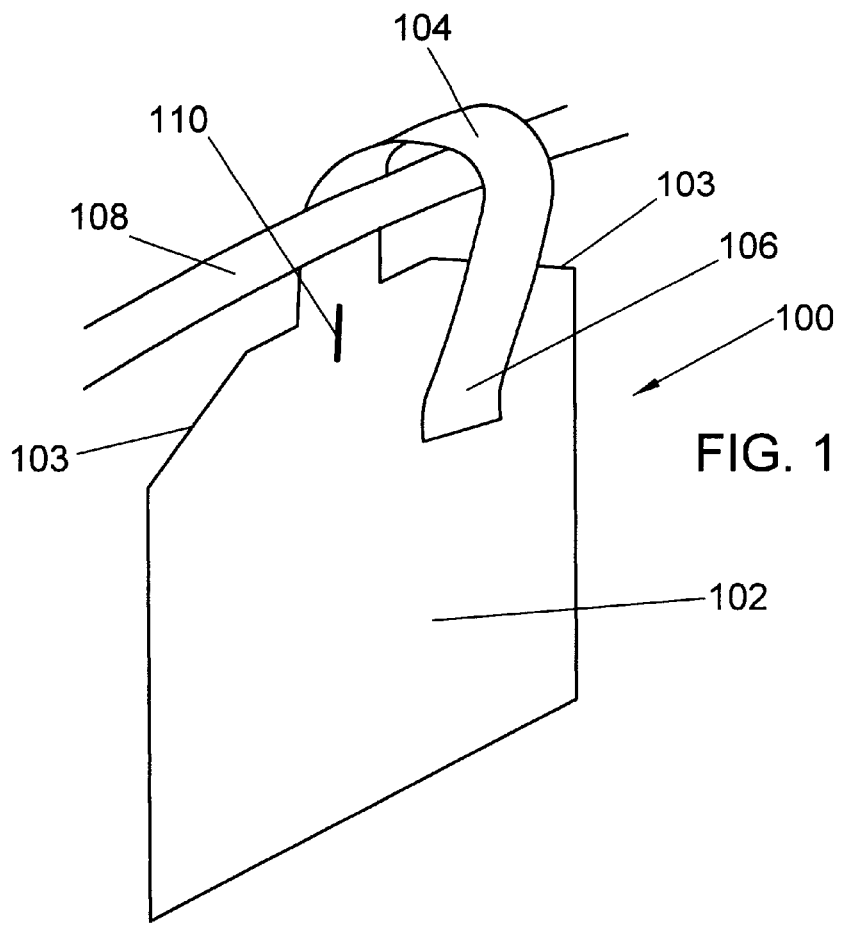
FIG. 1 is a perspective view of a preferred embodiment of a bird predation deterrent shield according to the present invention.

FIG. 1 shows a preferred embodiment of a bird predation deterrent shield 100 for a cat according to the present invention, comprising a substantially rectangular sheet 102 of flexible material and means for suspending sheet 102 from the anterior neck region of the cat. In a preferred embodiment of the present invention, sheet 102 may be at least as wide at its lower edge as the cat's shoulders in order to be positioned in front of both forelimbs of the cat when suspended from the cat's neck, thereby interfering with the cat's bird predation behaviors and/or movements. Sheet 102 may also be sufficiently long to interfere with the cat's bird predation behaviors and/or movements, but short enough not to interfere with other behaviors and activities of the cat. In a preferred embodiment of the present invention, sheet 102 may be at least long enough to reach down to the level of the carpal regions of the cat when the cat is standing on all four limbs and sheet 102 is suspended from the cat's neck. In a preferred embodiment of the present invention, the upper edge of substantially rectangular sheet 102 may be provided with lateral downwardly sloped portions 103, which may reduce interference of sheet 102 with non-bird-predation-related activities of the cat. In a preferred embodiment of the present invention, sheet 102 may be constructed from Naugahyde®, an imitation leather made from vinyl bonded to fabric and which may be readily washed or cleaned.

In a preferred embodiment of the present invention, sheet 102 may be suspended from the cat's neck by a tab 104 of flexible sheet material extending upward from the upper edge of sheet 102 and terminating at end 106. End 106 and the back surface of sheet 102 may be provided with fasteners so that by securing end 106 to sheet 102 tab 104 may be formed into a loop for encircling cat collar 108, thus permitting ready attachment or removal of shield 100 to collar 108. In a preferred embodiment of the present invention, end 106 may be fastened to the back surface of sheet 102 by a Velcro® (i.e., hook and loop) type fastener. In a preferred embodiment of the present invention shield 100 may be provided with an opening 110 through which tags or other objects suspended from collar 108 may pass to hang in front of shield 100.

In order to reduce or prevent bird predation by a cat, shield 100 is placed on the cat prior to release of the cat into the outdoors. The shield may be removed upon return of the cat indoors. Testing carried out over a period exceeding a year resulted in a reduction in bird predation from an average of five bird kills per month per cat to one bird kill per three months per cat. This substantial reduction translates into four birds killed per year per cat instead of sixty birds killed. The extrapolation of these figures to the millions of domestic cats living in this and other countries suggests truly staggering reductions in the numbers of birds killed each year if widespread use and implementation of the apparatus and method according to the present invention were instituted.

Regular use of the shield interferes with normal bird predation behaviors and/or movements of the cat. Bird predation behaviors by the cat are observed to essentially cease after several weeks of consistent use of the shield whenever the cat is outdoors. After discontinuing use of the shield, normal bird predation behaviors and movements are observed to reappear after two to three weeks. The cat quickly learns to accept attachment of the shield before being released outdoors, and attempts by the cat to remove the shield stop within a few minutes of attachment of the shield to the cat's collar the first few times, and then cease to occur altogether thereafter.

U.S. Pat. No. 5,467,743 issued to Doose discloses a cat collar with means for securing a variety of ornamental and/or decorative items to the collar. However, the use of such secured items for deterrence of bird predation by the cat is not taught by this patent. Furthermore, this patent does not teach to construct the attached item sufficiently wide at its lower edge to obstruct both forelimbs, nor does it teach to construct the attached item sufficiently long to reach down to the level of the carpal regions of the cat while the item is attached to the collar and the cat is standing on all four limbs.

In an alternative embodiment of the present invention, the length of sheet 102 may vary from a minimum length sufficient to reach down to the level of the elbow joint region of the cat to a maximum length sufficient to reach down to the level of the metacarpal/phalangeal joint region of the cat, in each case when the cat is standing on all four limbs and sheet 102 is suspended from the neck of the cat.

In an alternative embodiment of the present invention, sheet 102 and/or tab 104 may be constructed from any suitable flexible material. Considerations in choosing a material include but are not limited to: light weight; flexibility; durability; ease of cleaning; and/or appearance. Color does not seem to affect the bird predation deterrence produced by the shield. If desired, the shield may be decorated with graphics and/or text for a variety of purposes. Without departing from inventive concepts disclosed and/or claimed herein, suitable shield and/or tab materials may include but are not limited to: fabric; plastic; rubber; vinyl; nylon; leather; canvas; Naugahyde®; laminated fabrics; polymer-impregnated fabrics; combinations thereof; and/or functional equivalents thereof. Without departing from inventive concepts disclosed and/or claimed herein: sheet 102 and tab 104 may be fabricated from the same material; sheet 102 and tab 104 may be fabricated from different materials; sheet 102 and tab 104 may comprise separate components which are permanently connected; sheet 102 and tab 104 may be fabricated from a single piece of flexible material.

In an alternative embodiment of the present invention, a variety of means may be employed for allowing ready attachment and removal of the shield to a cat collar. Tab 104 formed into a loop for encircling cat collar 108 as described hereinabove may be employed using any of a variety of fasteners, including but not limited to: Velcro® (i.e., hook and loop); snaps; buttons; hooks; ties; laces; buckles; clips; combinations thereof; and/or functional equivalents thereof. Alternatively, sheet 102 may be secured directly to collar 108 by means of any fasteners which may be repeatedly fastened and unfastened, including but not limited to: Velcro® (i.e., hook and loop); snaps; buttons; hooks; ties; laces; buckles; clips; combinations thereof; and/or functional equivalents thereof.

In an alternative embodiment of the present invention, end 106 of tab 104 may be permanently attached to sheet 102, thereby forming a permanent loop for encircling collar 108. Shield 100 is put on and removed from the cat by putting on and removing collar 108 from around the neck of the cat.

Figure 2:
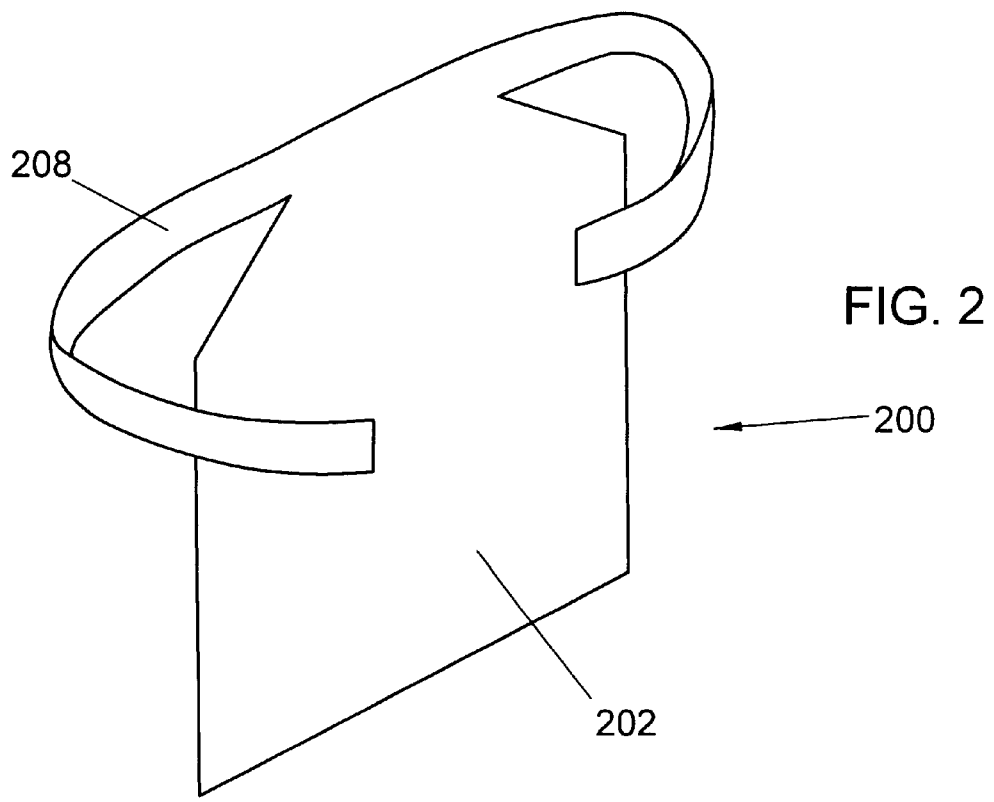
FIG. 2 is a perspective view of an alternative embodiment of a bird predation deterrent shield according to the present invention.

FIG. 2 shows an alternative embodiment of a bird predation deterrent shield 200 according to the present invention. Sheet 202 of flexible material is directly attached to cat collar 208, thereby forming an integral structure. Without departing from inventive concepts disclosed and/or claimed herein: sheet 202 and collar 208 may be fabricated from the same material; sheet 202 and collar 208 may be fabricated from different materials; sheet 202 and collar 208 may comprise separate components which are permanently connected; sheet 202 and collar 208 may be fabricated from a single piece of flexible material.

Figure 3:
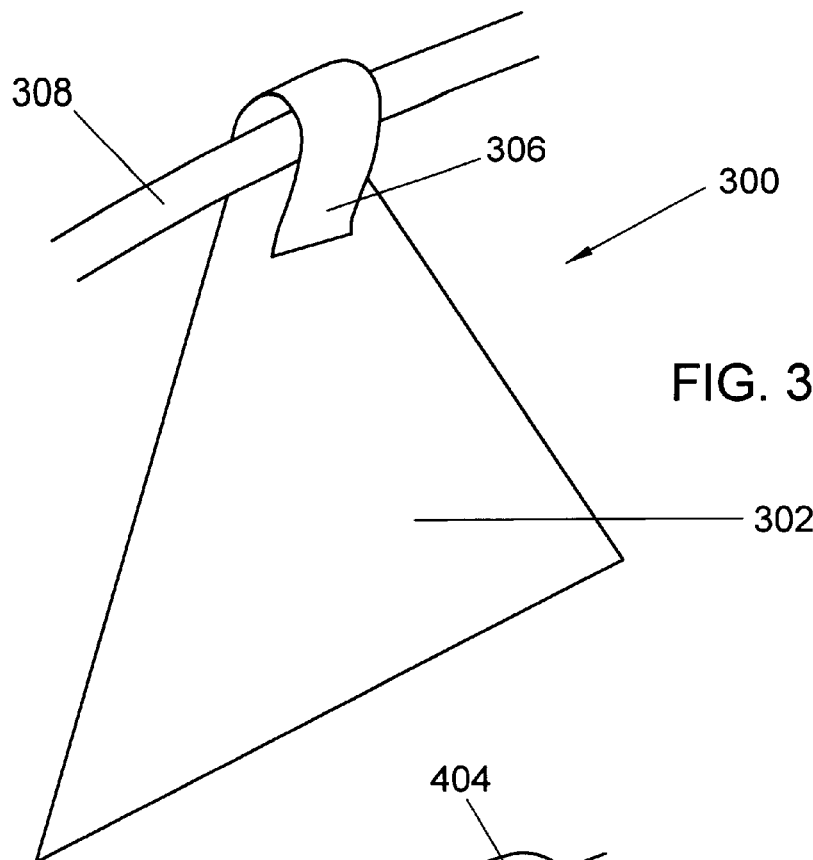
FIG. 3 is a perspective view of an alternative embodiment of a bird predation deterrent shield according to the present invention.

FIG. 3 shows an alternative embodiment of a bird predation deterrent shield 300 according to the present invention. Sheet 302 comprises a substantially triangular sheet of flexible material. The base of the triangular shape forms the lower edge of sheet 302. The apex 306 of triangular sheet 302 may be folded over and secured to the back surface of sheet 302 thereby forming a loop for encircling cat collar 308 and suspending sheet 302 from collar 308. Apex 306 may be secured to the back surface of sheet 302 as described hereinabove. Alternatively, apex 306 of sheet 302 may be secured directly to collar 308 as described hereinabove.

Figure 4:
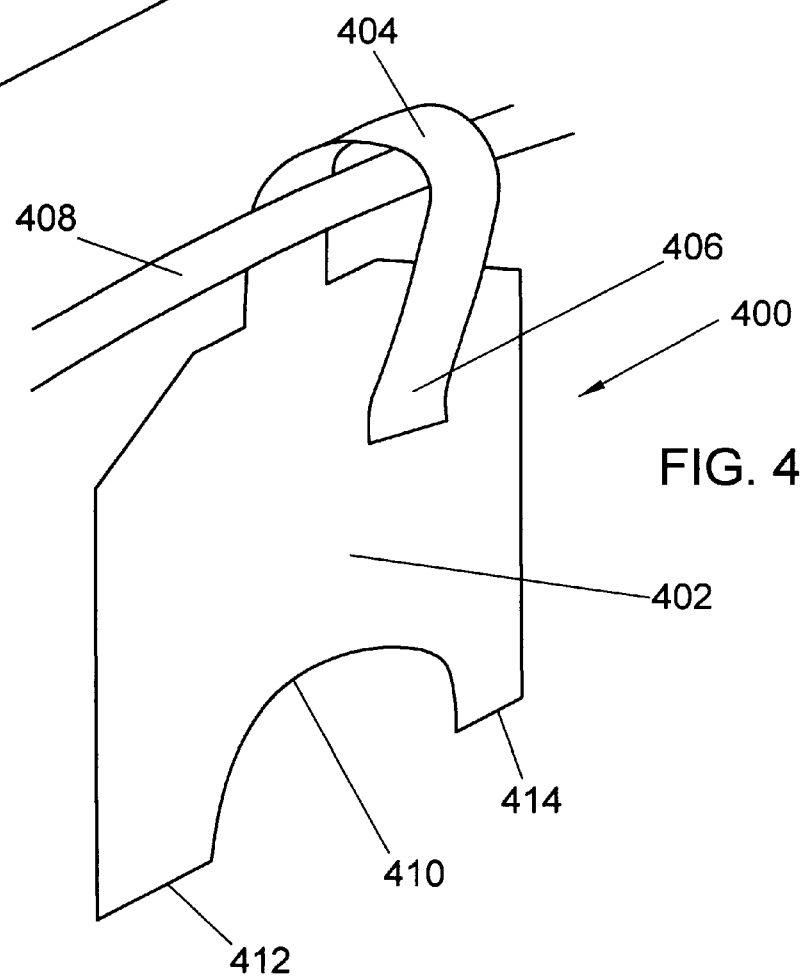
FIG. 4 is a perspective view of an alternative embodiment of a bird predation deterrent shield according to the present invention.
Figure 5:
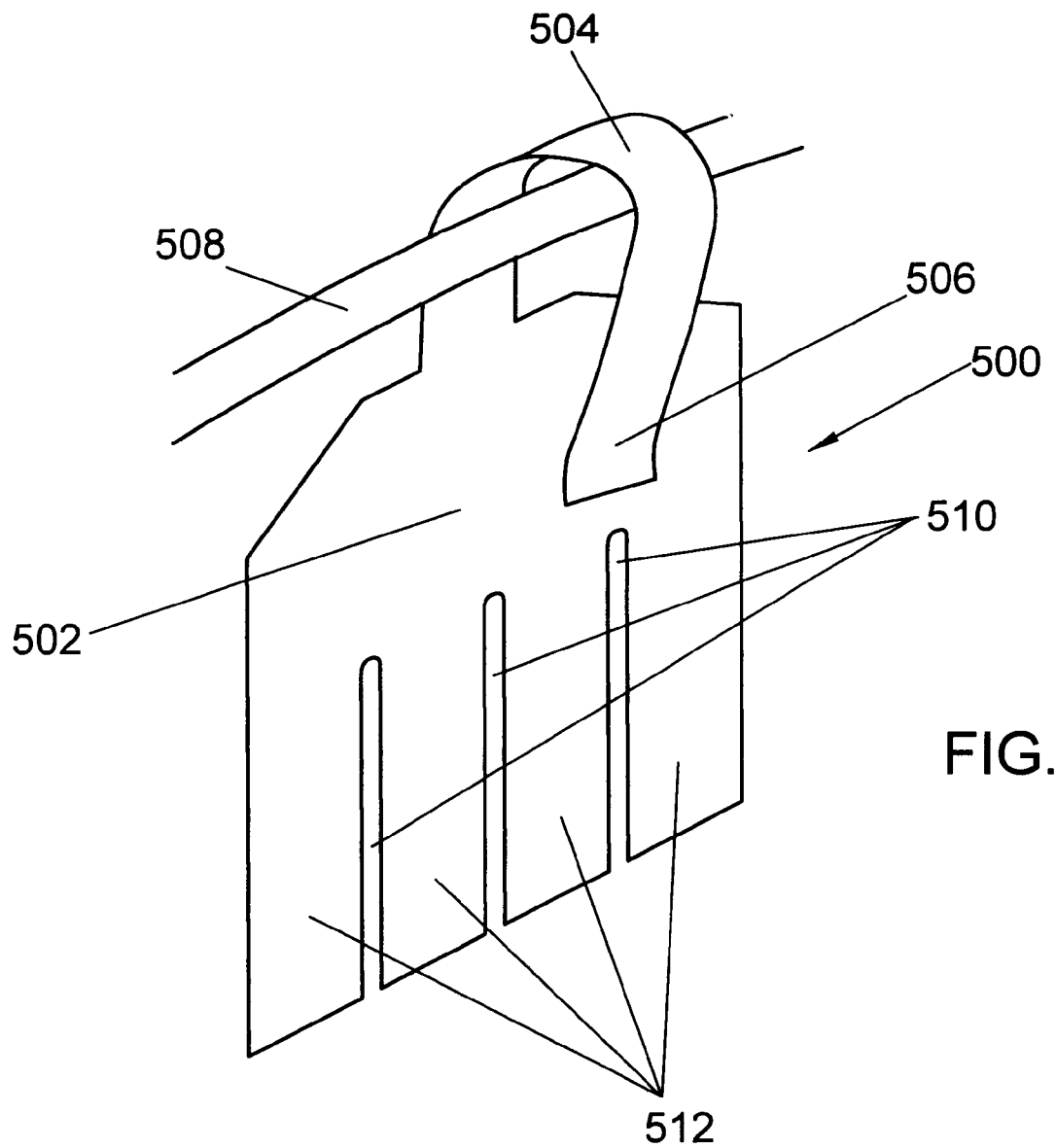
FIG. 5 is a perspective view of an alternative embodiment of a bird predation deterrent shield according to the present invention.

FIGS. 4 and 5 show alternative embodiments of bird predation deterrent shields according to the present invention wherein the lower edge of the shield is modified. In FIG. 4 the lower edge of sheet 402 of shield 400 is provided with a central upwardly extending concave section 410 positioned between substantially horizontal lateral sections 412 and 414. In FIG. 5 the lower edge of sheet 502 of shield 500 is provided with a plurality of upwardly extending vertical slits 510, thereby dividing the lower portion of sheet 502 into a plurality of downwardly depending portions 512. In each of these alternative embodiments, the modifications of the lower edge of the shield maintains bird predation deterrence while resulting in reduced interference with the cat's other activities.

The present invention has been set forth in the form of its preferred and alternative embodiments. It is nevertheless intended that modifications to the disclosed bird predation deterrent shield for a cat may be made without departing from inventive concepts disclosed and/or claimed herein.

What is claimed is:

1. A bird predation deterrent shield for a cat, comprising:
   a sheet of flexible material having a front surface, a back surface, a lower edge, an upper edge, a first side edge, and a second side edge; and
   means, located near the upper edge of said sheet, for suspending said sheet substantially vertically from an anterior neck region of the cat;
   wherein said sheet is at least as wide at the lower edge of said sheet as shoulders of the cat, and sufficiently long to reach at least down to the level of an elbow joint region of the cat when the cat is standing on four limbs and said sheet is suspended from the anterior neck region of the cat.

2. A bird predation deterrent shield for a cat as recited in claim 1, wherein said sheet is sufficiently long to reach at least down to the level of a carpal region of the cat when the cat is standing on four limbs and said sheet is suspended from the anterior neck region of the cat.

3. A bird predation deterrent shield for a cat as recited in claim 2, wherein said sheet is substantially rectangular in shape.

4. A bird predation deterrent shield for a cat as recited in claim 3, wherein the upper edge of said substantially rectangular sheet comprises a first lateral sloped section, a central substantially horizontal section, and a second lateral sloped section.

5. A bird predation deterrent shield for a cat as recited in claim 4, wherein said means for suspending said sheet from the anterior neck region of the cat comprises a tab of flexible material connected to and extending upward from the upper edge of said sheet and a hook and loop type fastener for attaching an upper end of said tab to the back surface of said sheet, thereby forming a loop for encircling a collar around the neck of the cat and suspending said sheet from the collar, and wherein said sheet is provided with an opening therethrough, thereby allowing an object suspended from the collar to pass through said opening and hang in front of said sheet.

6. A bird predation deterrent shield for a cat as recited in claim 2, wherein:
   said means for suspending said sheet from the anterior neck region of the cat comprises a collar for encircling the neck of the cat and having an inner surface, an outer surface, an upper edge, and a lower edge;
   the upper edge of said sheet is connected to said collar; and
   said sheet and said collar form an integral structure.

7. A bird predation deterrent shield for a cat as recited in claim 2, wherein said means for suspending said sheet from the anterior neck region of the cat comprises means for removably connecting the upper edge of said sheet to a collar around the neck of the cat.

8. A bird predation deterrent shield for a cat as recited in claim 7, wherein said means for connecting said sheet to the collar comprises a tab of flexible material connected to and extending upward from the upper edge of said sheet and a fastener for attaching an upper end of said tab to the back surface of said sheet, thereby forming a loop for encircling the collar and suspending said sheet from said collar.

9. A bird predation deterrent shield for a cat as recited in claim 8, wherein said fastener comprises a hook and loop type fastener.

10. A bird predation deterrent shield for a cat as recited in claim 7, wherein said sheet is provided with an opening therethrough, thereby allowing an object suspended from the collar to pass through said opening and hang in front of said sheet.

11. A bird predation deterrent shield for a cat as recited in claim 1, wherein said sheet is sufficiently long to reach at least down to the level of a metacarpal/phalangeal joint region of the cat when the cat is atanding on four limbs and said sheet is suspended from the anterior neck region of the cat.

* * * * *